United States Patent [19]

Tigner

[11] 3,919,122

[45] Nov. 11, 1975

[54] MANUFACTURE OF RESINOUS COMPOSITIONS HAVING HIGH ELECTROCONDUCTIVITY

[75] Inventor: Reuben A. Tigner, Bay City, Mich.

[73] Assignee: The Dow Chemical Company, Midland, Mich.

[22] Filed: Feb. 12, 1973

[21] Appl. No.: 331,508

[52] U.S. Cl. .................. 252/512; 252/518

[51] Int. Cl.$^2$ .................. H01B 1/06

[58] Field of Search .................. 252/512, 518, 514

[56] References Cited

UNITED STATES PATENTS 3,493,369 2/1970 Busch et al. .................. 252/512

OTHER PUBLICATIONS

Fettes, E. M. (ed.), Chemical Reaction of Polymers, Interscience, N.Y., 1964, pp. 79–80.

*Primary Examiner*—Benjamin R. Padgett
*Assistant Examiner*—R. E. Schafer
*Attorney, Agent, or Firm*—Michael S. Jenkins

[57] ABSTRACT

Non-conductive or poorly conductive resinous materials such as organic polymers are rendered highly conductive, e.g., volume resistivities as low as $10^{-3}$ ohm-cm, by including therein a finely divided, copper metal-containing solid, a reactive metal such as zinc, silver or the like and a halide source such as a vinylidene chloride copolymer and reacting the reactive metal with the halide source to form the conductive material. Such compositions can be fabricated into thin layers which are useful as electrodes in capacitors and into other articles wherein electroconductivity is required.

14 Claims, No Drawings

MANUFACTURE OF RESINOUS COMPOSITIONS HAVING HIGH ELECTROCONDUCTIVITY

BACKGROUND OF THE INVENTION

The invention relates to the manufacture of highly conductive resinous compositions containing a resinous material and a finely divided conductive solid.

Conductive resinous compositions, i.e., compositions formulated from a resinous binder material which has been filled with particulates of conductive materials such as carbon black, metals such as copper and silver, and the like have been widely used as electrical cable jacketings, electrical resistors, in heating elements and printed circuits as electrodes for capacitors, as conductive adhesives and so forth. See, for example, U.S. Pat. Nos. 3,412,358, 3,056,750, 3,359,145, 2,165,738 and 3,185,907.

Unfortunately, in order to achieve even moderate degrees of conductivity, i.e., resistances less than one ohm-cm, required in many applications, it has been necessary to incorporate as much as 75 weight percent of the conductive particulate based on the resinous binder. At such levels of the conductive filler, the ease of fabrication and the overall strength of the conductive composition are often reduced to the point that they are either not acceptable or are marginally so for the intended use. Some high degrees of conductivity, i.e., less than 0.1 ohm-cm, cannot be practically achieved by conventional incorporation of a conductive particulate into a resinous binder.

Therefore, it would be highly desirable to provide a method for the manufacture of a resinous composition having moderate or high degrees of conductivity at levels of conductive particulate much lower than those required in prior art conductive compositions.

SUMMARY OF THE INVENTION

The present invention is, in one aspect, a method for manufacturing a conductive resinous composition which comprises incorporating a copper metal-containing, particulate solid and a reactive metal as defined hereinafter into a non-conductive or semiconductive resinous material containing a halide source and then reacting the metal with the halide source to form the conductive composition.

In a further aspect, the invention is the composition comprising copper metal-containing particulate solid and reactive metal uniformly dispersed in the resinous material containing the halide source and the compositions resulting from reacting the reactive metal with the halide source in such compositions.

In a further aspect, the present invention is a method for fabricating multilayer structures employing the conductive resinous composition wherein the resinous material is an extrudable, thermoplastic polymer. Specifically, said method comprises the coextrusion of said conductive, thermoplastic, resinous composition as one or more layers of a multilayer structure wherein the layers of the conductive composition are separated by one or more layers of other extrudable, non-conductive materials. Such multilayer structures are useful as capacitors and printed circuits wherein the conductive composition is used as the electrodes and/or other conductive parts in such articles.

The conductive compositions are also useful generally in applications requiring electroconductive plastics.

DETAILED DESCRIPTION OF THE PREFERRED EMBODIMENTS

The resinous material used in the practice of the present invention is suitably any poorly conductive resinous material capable of serving as a binder for finely divided metals. For the purposes of this invention, the term "resinous material" means a solid or semi-solid material derived from natural products (so-called natural resins) and those produced by polymerization (so-called synthetic resins). By "poorly conductive" is meant that the resinous materials may be non-conductive materials having volume resistivities in the order of $10^{14}$ ohm-cm as those commonly employed as dielectric materials in many electrical applications or they may be semi-conductive such as those materials commonly employed as electroconductive paper coatings and the like having volume resistivities in the range of $10^6$–$10^9$ ohm-cm. Preferably, the resinous material is a normally solid or semi-solid, thermoplastic polymer, especially one which can be readily fabricated by normal extrusion and molding methods. It is understood, however, that thermosetting polymers are also suitable.

Exemplary preferred polymers include the organic addition polymers of the following monomers: aliphatic $\alpha$-monoolefins such as ethylene, propylene, butene-1, and isobutene; vinyl halides such as vinyl chloride, vinyl bromide and vinylidene chloride; esters of $\alpha,\beta$-ethylenically unsaturated carboxylic acids such as ethyl acrylate, methyl methacrylate, hydroxyethyl acrylate and diethyl maleate; $\alpha,\beta$-ethylenically unsaturated carboxylic acids such as acrylic acid, methacrylic acid, maleic anhydride, itaconic acid and fumaric acid; monovinylidene aromatic carbocyclic monomers such as styrene, $\alpha$-methyl styrene, ar-chlorostyrene, ar-(t-butyl)-styrene and vinyl benzyl quaternary ammonium compounds; conjugated dienes such as butadiene and isoprene; ethylenically unsaturated nitriles, amines, ethers, ketones and other ethylenically unsaturated compounds such as acrylonitrile, vinyl pyridine, ethyl vinyl ether and methyl vinyl ketone. Also suitable are the cellulosic polymers such as methyl cellulose and ethyl cellulose, polyamines such as polyethyleneimine, polyamides such as nylon, polyesters such as poly(ethylene terephthalate), polycarbonates and the like. Also, non-organic polymers as the silicone rubbers are suitable resinous materials. Especially preferred resinous materials are the ethylene polymers such as polyethylene, ethylene/vinyl acetate copolymer, ethylene/acrylic acid copolymer and ethylene/butene-1 copolymers, halogen-containing polymers such as polyvinyl chloride, polyvinylidene chloride, vinylidene chloride copolymers including such other comonomers as vinyl chloride and acrylonitrile, and chlorinated polyethylene.

In addition to the foregoing polymers, the natural resins such as rosin, pine tar and the like also may be suitably employed as resinous materials.

The copper metal-containing component employed in the practice of this invention is suitably any finely divided, copper metal-containing solid, preferably one having an average particle size in the range from about 0.01 to about 150 microns, especially from about 1 to about 15 microns. In addition to metal particles composed entirely of copper, metal alloys containing copper and other metals such as zinc, aluminum, bismuth, silver, iron, nickel, and gold are also suitable. When the distribution of copper is uniform throughout the metal particles as in an alloy, the copper should constitute at least about 50 volume percent, preferably at least about 70 volume percent of the metal particles. Especially preferred are copper and metal alloys containing at least 90 volume percent copper and up to about 10 volume percent of zinc such as brass and bronze. The proportion of copper in the metal particulate can be reduced to a minimum of 10 volume percent of the particulate by plating copper on the surface of a particulate of another conductive metal such as iron, silver, gold and the like, e.g., as shown in U.S. Pat. No. 3,476,530 to Ehrreich et al or by depositing the copper on a particulate of a non-conductive resinous material by conventional metallizing techniques. Resinous materials suitable for this purpose are described hereinbefore. In such cases including plating or metallization, the copper should form an essentially continuous layer covering the particle surfaces of the particulate.

The reactive metal employed in the conductive polymeric composition is suitably a metal such as the alkali metals, e.g., sodium, lithium and potassium; and, calcium, zinc, silver, and lead. It is understood that the reactive metal may exist separate from or be alloyed or otherwise combined with the copper metal-containing solid as described hereinbefore. If the reactive metal exists separate from the copper metal-containing solid, the particle size of said reactive metal is in the range from about 0.01 to about 150 microns, especially from about 1 to about 15 microns. Preferably, the reactive metal is zinc and is present as in an alloy with copper which also serves as the copper metal-containing solid.

By "halide source" is meant a material containing chloride or bromide which will react with the reactive metal to convert the metal to a stable oxidized state. It is believed that the reaction yields the corresponding chloride or bromide of the reactive metal. Suitably, the halide source is a chloride or bromide salt such as cadmium chloride, ammonium chloride, ammonium bromide and the like; a chloride or bromide containing polymer such as polyvinyl chloride, vinylidene chloride homopolymers and copolymers including the vinylidene chloride/acrylonitrile copolymers and vinylidene chloride/vinyl) chloride copolymers, polyvinyl bromide, chlorinated polyethylene, and the like; chlorinated waxes such as chlorinated paraffin wax; and combinations of two or more of the foregoing salts, polymers and waxes. Preferably, the halide source is a chloride or bromide containing polymer, especially the vinylidene chloride copolymers. In such preferred embodiments, the chloride or bromide containing polymers can serve as the halide source and all or part of the resinous material.

In the conductive composition, the resinous material is used in sufficient amount to act as a continuous or semi-continuous phase thereby serving as a binder for the copper metal component, the reactive metal and the halide source if a halide salt is employed. The copper metal component, reactive metal and halide source are used in amount sufficient to render the composition electroconductive. For the purposes of this invention, a composition is considered to be electroconductive if the volume resistivity of the composition is less than $10^4$ ohm-cm. Preferably, in order to obtain an easily fabricated, economical material, the copper-containing solid constitutes from about 4 to about 50, especially from about 7 to about 15, volume percent of the composition, and the reactive metal and halide source are present in amounts sufficient to yield from about 0.01 to about 8 volume percent based on the composition of the reactive metal in an oxidized form. Generally, the halide source is present in amounts sufficient to provide from about 0.15 to about 60, preferably from about 0.34 to about 35, weight percent based on the composition of reactive bromine and/or chlorine atoms. For example, in a composition using zinc as the reactive metal and vinylidene chloride copolymer as the halide source, the amount of zinc is preferably in the range from about 0.03 to about 5 volume percent, and the amount of the copolymer is preferably in the range from about 0.3 to about 3 volume percent.

The conductive compositions are preferably prepared by incorporating bronze powder or a powder of another alloy of copper and reactive metal into the resinous material including the chloride or bromide containing polymer by conventional polymer blending or mixing techniques such as roll milling, extrusion, kneading, dry blending or tumbling and the like. During or following the incorporation step, the composition is heated to a temperature sufficient to convert the reactive metal to an oxidized state. Temperatures in the range from about 350° to about 500°F, preferably from about 400° to about 475°F, are sufficient to effect the desired reaction. The composition is maintained until reaction occurs. Usually, occurrence of reaction is indicated by a change in color of the composition.

Generally in suitable embodiments of this invention, the resinous material, copper metal-containing solid, the reactive metal and halide source, which can all be added as separate parts or in various combinations to form the composition, are blended together using conventional blending or mixing techniques. During or following the blending operation, the resulting compositions are heated to obtain the desired reaction of the reactive metal.

In the fabrication of the conductive composition into thin layers, particularly into thin layered capacitors or printed circuits, the conductive material is coextruded with dielectric materials using a coextrusion apparatus as disclosed in U.S. Pat. No. 3,557,265 of Chisholm et al. to form a multilayer structure wherein two or more conductive layers are insulated from each other by layers of dielectric material. The thicknesses of layers that can be achieved by this technique range from about 0.004 to about 50 mils, especially from about 0.1 to about 30 mils. Exemplary dielectric materials which are suitably employed are non-conductive, resinous materials as described hereinbefore including normally solid, organic polymers and blends of such polymers and inorganic dielectric materials such as barium titanate, strontium zirconate, titanium dioxide, calcium titanate, strontium titanate, barium zirconate, magnesium zirconate, calcium zirconate and other known dielectric materials. In the manufacture of capacitors, it is desirable to modify the coextrusion apparatus so that consecutive layers of the electroconductive composition are offset. In the resulting multilayer capacitor, alternating layers of the electroconductive composition can be connected to an electrical lead wire which is insulated from the next adjacent layers of the electroconductive composition.

Fabrication of the conductive resinous materials into other articles as described hereinbefore is carried out using conventional apparatus and techniques for fabricating the particular resinous material in the non-conductive state. Exemplary fabrication methods include molding such as injection and compression molding, extrusion, die casting and the like.

It is understood that the reaction to convert the reactive metal to an oxidized state may occur during or following fabrication.

The following examples are given to illustrate the invention and should not be construed as limiting its scope. All parts and percentages are by weight unless otherwise indicated.

EXAMPLE 1

Several blends are prepared by mixing varying proportions of vinyl chloride/vinylidene chloride (27/73) copolymer ($VCl/VCl_2$), brass powder (90 percent Cu, 10 percent Zn having an average particle size range of 5–12 microns with 40 percent at about 12 microns), polyethylene (PE) having a density of 0.921 g/cc and melt index of 3 decig/min and ethylene/vinyl acetate (72/28) copolymer (EVA) on a roll mill at 266°F until a uniform mixture of brass powder is achieved. The blends are molded into test tabs (4 × 4 × 0.01 inch) by pressing between two plates and heating at 475°F for 5 minutes. During the heating period the color of the test tabs is observed to change from a yellow-brown to a red-brown. The volume resistivities of the resultant test tabs are measured and the results are recorded in Table I.

the ingredients on a compounding roll mixer at 266°F until a uniform dispersion of the brass powder is achieved. The blend is divided into portions and molded into test tabs (4 × 4 × 0.01 inch) under the conditions specified in Table II. The volume resistivities and color of the resultant test tabs are determined and the results are recorded in Table II.

For purposes of comparison, a control blend ($C_3$) is prepared by the foregoing procedure except that no $VCl/VCl_2$ copolymer is employed. The blend is molded into test tabs. The volume resistivities and color of the test tabs are determined, and the results are recorded in Table II.

TABLE II

| Sample No. | Molding Conditions(1) Temp. °F | Time, min. | Volume Resistivity(2) ohm-cm | Color(3) |
|---|---|---|---|---|
| 1 | 475 | 3 | 0.004 | Red brown |
| 2 | 450 | 3 | 0.008 | Red brown |
| 3 | 400 | 3 | 0.01 | Red brown |
| 4 | 350 | 3 | 21.0 | Yellow red brown |
| 5* | 300 | 3 | 34,560 | Yellow brown |
| $C_3$* | 475 | 3 | $2.5 \times 10^7$ | Yellow brown |

*Not an example of invention (1)Molding conditions otherwise in accordance with those described in Example 1.

(2)ASTM D991

(3)Samples prior to heating are a yellow brown. Reaction is indicated by conversion to a definite red brown.

TABLE I

| Sample No. | Brass Wt. | Brass Vol. | $VCl/VCl_2$ Wt. | $VCl/VCl_2$ Vol. | PE Wt. | PE Vol. | EVA Wt. | EVA Vol. | Volume Resistivity(1) ohm-cm |
|---|---|---|---|---|---|---|---|---|---|
| 1 | 45 | 9 | 2 | 1 | 12 | 12 | 6 | 6 | 0.001 |
| 2 | 21 | 4.2 | 2 | 1 | 12 | 12 | 6 | 6 | 0.012 |
| 3 | 14 | 2.8 | 2 | 1 | 12 | 12 | 6 | 6 | 0.027 |
| 4 | 54 | 10.8 | 3.5 | 1.7 | 14 | 14 | 7 | 7 | 0.010 |
| 5 | 21 | 4.2 | 1.2 | 0.6 | 12.5 | 12.5 | 6.3 | 6.3 | 0.002 |
| 6 | 48 | 9.6 | 16 | 8 | — | — | — | — | 0.018 |
| 7 | 41 | 8.2 | 3 | 1.5 | 12 | 12 | 6 | 6 | 0.006 |
| 8 | 30 | 6 | 2.5 | 1.2 | 12 | 12 | 6 | 6 | 0.014 |

Composition(2), parts

*Not an example of this invention.

(1)ASTM D991.

(2)Composition is prepared using weight parts of the components. Volume parts are calculated from weight parts and are approximate values.

As evidenced by the foregoing data, the presence of a $VCl/VCl_2$ copolymer during molding under the described conditions causes a reaction to occur which substantially decreases the volume resistivity of the polymeric composition. Analysis of the test tabs of Sample Nos. 1–8 by excited electron emission scanning confirms the presence of divalent zinc and divalent copper indicating reaction of the $VCl/VCl_2$ copolymer with the zinc of the brass powder.

EXAMPLE 2

A blend of 12.5 parts of the polyethylene, 6.3 parts of the ethylene/vinyl acetate copolymer, 1.2 parts of the vinyl chloride/vinylidene chloride (27/73) copolymer ($VCl/VCl_2$), all as employed in Example 1, and 21 parts of brass powder (80 percent Cu, 20 percent Zn having particles of sizes of 150 microns) is prepared by mixing As evidenced by the foregoing data, the test tabs must be heated to effect reaction of the ingredients in order to obtain a high degree of conductivity. Analysis of the red brown test tabs by excited electron emission scanning confirms the presence of divalent zinc thereby indicating that the $VCl/VCl_2$ copolymer reacts with the zinc of the brass powder to form zinc chloride.

EXAMPLE 3

Following the procedure of Example 1, several additional blends are prepared using the brass powder of Example 1, different polymers, and halide sources as identified in Table III. The blends are molded into test tabs (4 × 4 × 0.02 inch) by roll compounding, pressing and heating at 475°F for 5 minutes. The volume resistivities of the resultant test tabs are measured and the results are recorded in Table III.

TABLE III

| Sample No. | Polymer Type | Polymer Amount, parts Wt. | Amount of Metal(2), parts Vol. | Amount of Metal(2), parts Wt. | Halide Source Type | Halide Source Amount(2), parts Vol. | Halide Source Amount(2), parts Wt. | Volume Resistivity(1) ohm-cm |
|---|---|---|---|---|---|---|---|---|
| 1 | PE/EVA(a) | 47.1 | 10 | 50 | $ZnBr_2$ | 0.68 | 2.9 | 0.010 |
| 2 | PE/EVA(a) | 45.0 | 10 | 50 | $CdCl_2$ | 1.25 | 5.0 | 0.0045 |
| 3 | PE/EVA(a) | 45.3 | 10 | 50 | $NH_4Cl$ | 3.14 | 4.7 | 0.014 |
| 4 | P/Sty(b) | 47.1 | 10 | 50 | $VCl_2$/VCl(c) | 1.5 | 2.9 | 0.015 |
| 5 | — | | 10 | 50 | CPE(d) | 45.5 | 50 | 0.008 |
| 6 | PE(e) | 47.1 | 10 | 50 | $VCl_2$/VCl(c) | 1.5 | 2.9 | 0.002 |
| 7 | HDPE(f) | 39.5 | 11.5 | 57.6 | $VCl_2$/VCl(c) | 1.5 | 2.9 | 0.166 |
| 8 | PP(g) | 47 | 10 | 50 | $VCl_2$/VCl(c) | 1.5 | 3.0 | 0.010 |

(a)PE/EVA — blend of two weight parts of polyethylene (density = 0.921 g/cc and melt index = 3 decig/min) with one weight part of ethylene/vinyl acetate (72/28) copolymer
(b)P/Sty — polystyrene
(c)$VCl_2$/VCl — vinylidene chloride/vinyl chloride (73/27) copolymer
(d)CPE — chlorinated polyethylene having a chlorine content of 20% and a melt index of 3 decig/min.
(e)PE — polyethylene (density = 0.921 g/cc and melt index = 3 decig/min.)
(f)HDPE — polyethylene (density = 0.95 g/cc and melt index = 0.85 decig/min.)
(g)PP — polypropylene
(1)Same as in Table I
(2)Same as in Table I Results similar to the ones shown in the foregoing Examples are obtained when other resinous materials as described hereinbefore are substituted for the blend employed in the foregoing Examples. Also it is found that compositions containing different amounts of various copper metal-containing solids, reactive metals and halide sources as specified hereinbefore have conductivities suitable for the purposes of this invention.

Similarly, articles having suitable electroconductivity as defined herein are obtained by extruding thin layers of the aforementioned compositions. Also articles having excellent capacitance are prepared by coextruding the foregoing electroconductive compositions in alternating layers with conventional extrudable dielectric material, using the coextrusion apparatus described in U.S. Pat. No. 3,557,265 of Chisholm et al.

What is claimed is:

1. A method for manufacturing an electroconductive resinous composition which comprises (1) incorporating into a poorly conductive resinous material having a volume resistivity greater than $10^6$ ohm-cm; a copper metal-containing particulate solid, wherein copper metal constitutes at least 50 volume percent of the solid if copper metal is distributed throughout the solid and at least 10 volume percent if the copper metal forms an essentially continuous layer covering the particle surfaces of the solid, a reactive metal selected from the group consisting of zinc, silver, alkali metals, calcium, and lead and a halide source containing bromide or chloride which will react with the reactive metal to convert the metal to a stable oxidized state and (2) reacting the halide source with the reactive metal whereby the resinous composition having a volume resistivity less than $10^4$ ohm-cm is formed.

2. The method of claim 1 wherein the resinous material is a thermoplastic organic polymer.

3. The method of claim 1 wherein the halide source is a chloride containing polymer.

4. The method of claim 3 wherein the chloride containing polymer is a vinylidene chloride polymer.

5. The method of claim 3 wherein the chloride containing polymer is chlorinated polyethylene.

6. The method of claim 1 wherein the copper metal-containing particulate solid and reactive metal exist in the form of a powder of an alloy of copper and reactive metal having an average particle size in the range from about 0.01 to about 150 microns.

7. The method of claim 1 wherein the reactive metal is zinc.

8. The method of claim 1 wherein said particulate solid comprises from about 4 to about 50 volume percent of said composition and the halide source and the reactive metal are present in amounts sufficient to yield from about 0.01 to about 8 volume percent, based on said composition, of the reactive metal in oxidized form.

9. The method of claim 8 wherein said composition comprises from about 7 to about 15 volume percent of the particulate solid, from about 0.03 to about 5 volume percent of zinc and from about 0.3 to about 3 volume percent of a vinylidene chloride copolymer.

10. The method of claim 1 wherein the halide source is reacted with the reactive metal by heating the resinous material containing the particulate solid, the reactive metal and the halide source at a temperature in the range from about 350° to about 500°F.

11. The method of claim 10 wherein the resinous material comprising a chloride-containing thermoplastic organic polymer and an alloy of copper and zinc in the form of a powder having an average particle in the range from about 0.01 to about 150 microns is heated at a temperature in the range from about 400° to about 475°F.

12. The method of claim 11 wherein the chloride-containing polymer is a vinylidene chloride copolymer.

13. The method of claim 11 wherein the resinous material also contains a polymer of an aliphatic α-monoolefin.

14. The method of claim 13 wherein the resinous material contains polyethylene and an ethylene/vinyl acetate copolymer.

* * * * *